US009854338B2

(12) United States Patent
Gyselings et al.

(10) Patent No.: US 9,854,338 B2
(45) Date of Patent: Dec. 26, 2017

(54) TIMESLOT MANAGEMENT METHOD, A RELATED NETWORK TERMINATOR, A RELATED LINE TERMINATOR AND AN UPSTREAM SIGNAL FRAME STRUCTURE FOR A TIME DIVISION MULTIPLE ACCESS SYSTEM

(75) Inventors: Tim Gyselings, Deurne (BE); Edwin August Philomena Ringoot, St. Jansteen (NL); Erwin Alfons Constant Six, Laarne (BE); Brecht Stubbe, Ghent (BE)

(73) Assignee: Alcatel Lucent, Boulogne-Billancourt (FR)

( * ) Notice: Subject to any disclaimer, the term of this patent is extended or adjusted under 35 U.S.C. 154(b) by 1977 days.

(21) Appl. No.: 10/436,055

(22) Filed: May 13, 2003

(65) Prior Publication Data

US 2003/0219031 A1  Nov. 27, 2003

(30) Foreign Application Priority Data

May 21, 2002 (EP) .................................... 02291251

(51) Int. Cl.
*H04L 12/43* (2006.01)
*H04Q 11/04* (2006.01)
*H04J 3/16* (2006.01)

(52) U.S. Cl.
CPC ........ *H04Q 11/0478* (2013.01); *H04J 3/1694* (2013.01)

(58) Field of Classification Search
USPC ....... 370/229, 230, 236, 312, 314, 330, 336, 370/337, 347, 349, 392, 395.4, 458, 468
See application file for complete search history.

(56) References Cited

U.S. PATENT DOCUMENTS 6,243,364 B1  6/2001 Pihlaja
6,697,374 B1 *  2/2004 Shraga et al. ................ 370/458
(Continued)

FOREIGN PATENT DOCUMENTS

EP  0 854 659 A1  7/1998

OTHER PUBLICATIONS

"ITU-T Recommendation G.983.1 Broadband optical access systems based on Passive Optical Networks (PON)", Oct. 1998, pp. 1-111.

(Continued)

*Primary Examiner* — Kwang B Yao
*Assistant Examiner* — Nguyen Ngo
(74) *Attorney, Agent, or Firm* — Chiesa Shahinian & Giantomasi, PC

(57) ABSTRACT

A time slot management method for use in a time division multiple access system that couples a line terminator via a tree-like network to a plurality of network terminations is provided. At least one grant is transmitted by the line terminator towards a network terminator in order to allocate at least one adjacent subsequent corresponding upstream time-slot to the network terminator. The grant is received by the network terminator from the line termination, and it is recognized if the at least one grant is associated to the network termination. Upon recognition of the at least one grant being associated to the network termination by the network terminator, overhead data in the first time slot of the at least one time slot and payload data in each potential adjacent subsequent time slot of at least one time-slot allocated to said network terminator is transmitted.

8 Claims, 4 Drawing Sheets

(56) References Cited

U.S. PATENT DOCUMENTS

| | | |
|---|---|---|
| 7,031,343 B1* | 4/2006 | Kuo et al. .................. 370/473 |
| 7,103,065 B1* | 9/2006 | Quigley et al. ............. 370/465 |
| 2002/0051455 A1* | 5/2002 | Lee et al. ................ 370/395.21 |
| 2002/0126686 A1* | 9/2002 | McKinnon et al. ......... 370/442 |

OTHER PUBLICATIONS

Y. Takigawa et al., "ATM based Passive Double Star system offering B-ISDN, N-ISDN, and POTS", *IEEE*, XP 000428022, 1993, pp. 14-18.

* cited by examiner

TIMESLOT MANAGEMENT METHOD, A RELATED NETWORK TERMINATOR, A RELATED LINE TERMINATOR AND AN UPSTREAM SIGNAL FRAME STRUCTURE FOR A TIME DIVISION MULTIPLE ACCESS SYSTEM

BACKGROUND OF THE INVENTION

The present invention relates to a time slot management method as defined in the preamble of claim 1, a related network terminator as defined in the preamble of claim 7, and a related line termination as defined in the preamble of claim 8.

Such a method and related device are already known in the art, e.g. from "ITU-T Recommendation G.983.1 Broadband optical access systems based on passive Optical Networks (PON)".

Therein, the method and related devices are described in more specifically 155/155 Mbit/sec and 622 (downstream)/155 Mbit/sec systems wherein upon detection of its identity in a received downstream grant, a network terminator can use a 155 Mbit/s upstream timeslot to send upstream an upstream data packet.

In this G.983.1 Recommendation, more particular at paragraph 8.3.4 and paragraph 8.3.5 the upstream interface and the transport specific TC functions is described. Herein, it is indeed described that the upstream interface comprises the presence of overhead bytes that are added in front of each upstream Asynchronous Transfer Mode (ATM) cell. An upstream timeslot comprises 56 bytes i.e. 3 overhead bytes in front of 53 payload bytes i.e. an ATM cell. In Table 6/G.983.1 the overhead bytes are described. This table describes a guard time, a preamble and a delimiter. The guard time is defined in order to provide enough distance between two consecutive cells to avoid collisions. The preamble is defined in order to enable a line terminator, upon reception of an upstream data packet, to extract the phase of the arriving cell relative to the local timing of the line terminator and/or to acquire bit synchronisation and amplitude recovery. The delimiter is defined as a unique pattern that indicates the start of the ATM cell that can be used to perform byte synchronisation.

A disadvantage of the above described method to share upstream bandwidth is that in the event of an upgrade of a network terminator and line terminator towards a higher upstream transmission rate with e.g. a bitrate that increases above 155 Mbps, the upstream overhead such as the above described 3 bytes, becomes too short for the required guard time and transmitter setting and receiver setting and indication of the start of the payload. Indeed, the relative duration of the upstream overhead bytes decreases with increasing bitrate. Within this relatively shortened period of time it gets very complicated to have a sufficient guard time, to set all transmitter settings, to set all receiver settings and to indicate the start of the payload.

Physical layer overhead in currently standardised solutions is not adequate at gigabit rates. Just increasing the length means that the overhead to payload ratio for all the information packets (Physical Layer Operations, Administration and Maintenance (PLOAM) messages, ATM cells, modem buffer status reporting) will become inadequate.

SUMMARY OF THE EXEMPLARY EMBODIMENTS OF THE INVENTION

An object of the present invention is to provide a time slot management method in such a time division multiple access system, a related network terminator and a related line terminator of the above known type but which would allow a further upgrade of the existing systems to higher upstream speeds but providing an overhead with a sufficient long guard time and sufficient space for providing with a well performing preamble and delimiter while still having a good overhead/payload ratio.

According to the invention, this object is achieved by the method as defined in claim 1, the network terminator as defined in claim 7, and the line termination as defined in claim 8.

Indeed the object is achieved due to the fact that at least one time-slot is allocated to an upstream data burst while the first time slot of the at least one time slot (this burst), which may be a multi-slot burst of data, is reserved for overhead data. The length of such a timeslot containing overhead data is sufficient for guaranteeing a sufficient long guard time and sufficient byte space for obtaining well performing preamble and delimiter. In this way the overhead of a number of time-slots is combined in the first time slot of a multi-time-slot burst providing an overhead with a sufficient long guard time and sufficient space for providing with a well performing preamble and delimiter. Moreover each possible subsequent adjacent time slot of said first time-slot is dedicated to data. In this way the guard time of the overhead part of the datapacket is sufficient long and by using time slots for data the ratio of data to overhead has increased compared to the prior art ratio.

An additional advantage of using subsequent timeslots for data is that the segmentation for large size data packets which were forwarded among multiple bursts, will be reduced significantly as a long frame, e.g. an ethernet frame, can be forwarded in a number of adjacent subsequent time-slots.

Another characteristic embodiment of the present invention is that, as described in claim 2, the overhead data forwarded in an overhead timeslot comprises status reporting information and Operation and Maintenance information (OAM). By adding additional signalling information such as overhead data comprising status reporting information and Operation and Maintenance information (OAM) to each said time slot containing overhead information, resources are used more efficiently compared to the prior art as this information in the prior art is transported using additional separate time slots.

An additional advantageous feature is defined in claim 3.

The payload data transported after the first time slot in an upstream burst may additionally comprise further management information. Additional management information may in this way be forwarded from each of the network terminators towards the line terminator.

A further characteristic feature is defined in claim 4.

The payload data slots are filled with Asynchronous Transfer Mode Cells.

An additional characteristic feature is described in claim 5.

The payload data slots are filled with Ethernet Cells.

A further characteristic embodiment is described in claim 6.

Each network termination of said a plurality of network terminations NT1, NT2, . . . , NT31, NT32 is allocated at least one time-slot for transmitting data each buffer reporting interval. In this way each network termination has the opportunity to forward overhead data and/or payload per reporting time interval. The size of this interval is limited by the Quality of Service contracts the network has to support. When Cell Transfer Delay and Cell Delay Variation of this traffic has to be within certain predefined limits, this means that the interval between consecutive Network Terminator Dynamic Bandwidth Allocation (DBA) buffer reports (in overhead slot messages) cannot be too large. This leads to a maximum buffer reporting interval $T_{rep}$, in which all NTs have to report once, and as such to the interval in which a scheduler will typically schedule one single multi-slot burst to each NT.

In case a Network terminator has no data to send, only one time-slot is allocated to that network terminator for sending overhead data towards the Line terminator.

It is to be noticed that the term 'comprising', used in the claims, should not be interpreted as being restricted to the means listed thereafter. Thus, the scope of the expression 'a device comprising means A and B' should not be limited to devices consisting only of components A and B. It means that with respect to the present invention, the only relevant components of the device are A and B.

Similarly, it is to be noticed that the term 'coupled', also used in the claims, should not be interpreted as being restricted to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

BRIEF DESCRIPTION OF THE DRAWINGS

The above and other objects and features of the invention will become more apparent and the invention itself will be best understood by referring to the following description of an embodiment taken in conjunction with the accompanying drawings wherein.

DETAILED DESCRIPTION OF EXEMPLARY EMBODIMENTS OF THE INVENTION

The time division multiple access network includes a line terminator LT and a plurality of network terminators NT1, NT2, NT3, ..., NT31, NT32. The line terminator LT is coupled to each network terminator NT1, NT2, NT3, ..., NT31, NT32 via the cascade connection of a common transmission link Lc and an individual user link L1, L2, L3, ..., L31, L32.

The time division multiple access network is an optical network transporting for instance asynchronous transfer mode ATM cells over optical fibers from the line terminator LT to the network terminators NT1, NT2, NT3, ..., NT31, NT32. The time division multiple access network broadcasts network terminator identities or grants in downstream information packets from the line terminator LT to the plurality of network terminators NT1, NT2, NT3, ..., NT31, NT32. Upon detection of its own identity a network terminator is allowed to transfer a predetermined amount of upstream information packets in predetermined upstream timeslots to the line terminator LT. For example: upon detection of network terminator NT3 of its own identity, network terminator NT3 is allowed to send to the line terminator upstream information packets in predetermined timeslots.

Each network terminator, whereof only network terminator NT2 is shown in detail in order not to overload the figure, includes a receiver REC for receiving the grants forwarded by the line termination LT, a recognition part RP that is able to recognise if the grant is associated to the network termination NT2, and a transmitter TR that is able to transmit upon recognition of a multi-slot grant being associated to the network termination NT2 by the network terminator NT2, overhead data in the first time-slot of a multi-slot burst and data in each adjacent subsequent multi-slot data burst time slot allocated to the network terminator.

Figure 1:
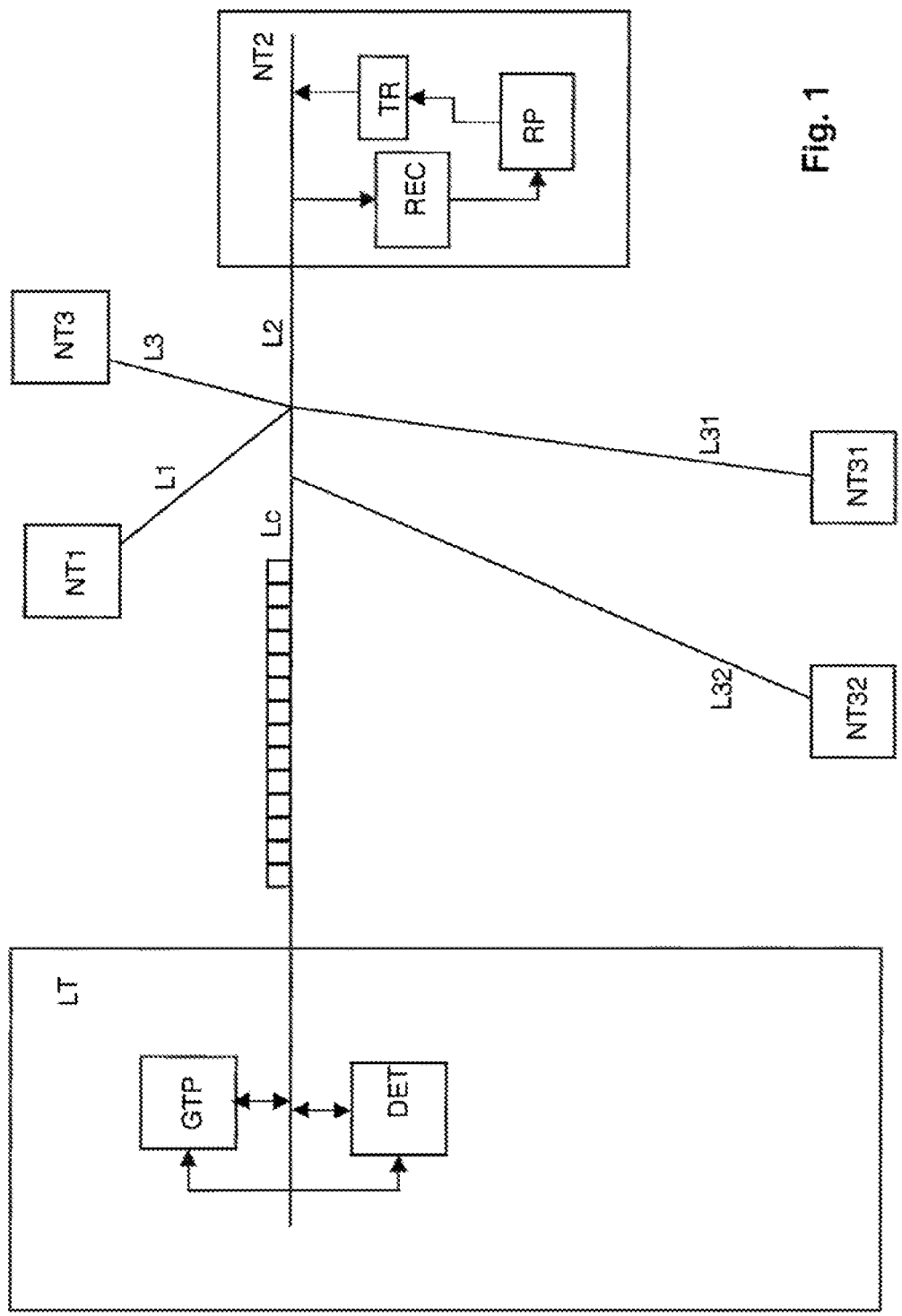
FIG. 1 shows a block scheme of an embodiment of a time division multiple access network wherein the method of the invention is used.
Figure 2:
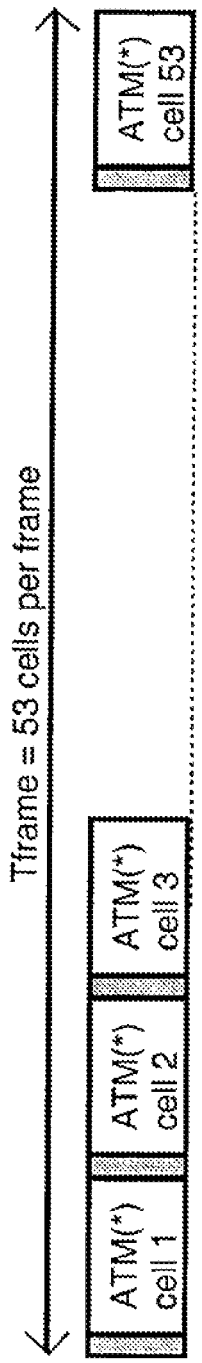
FIG. 2 shows an upstream timeslot format used by a time division multiple access network according to the prior art.
Figure 3:
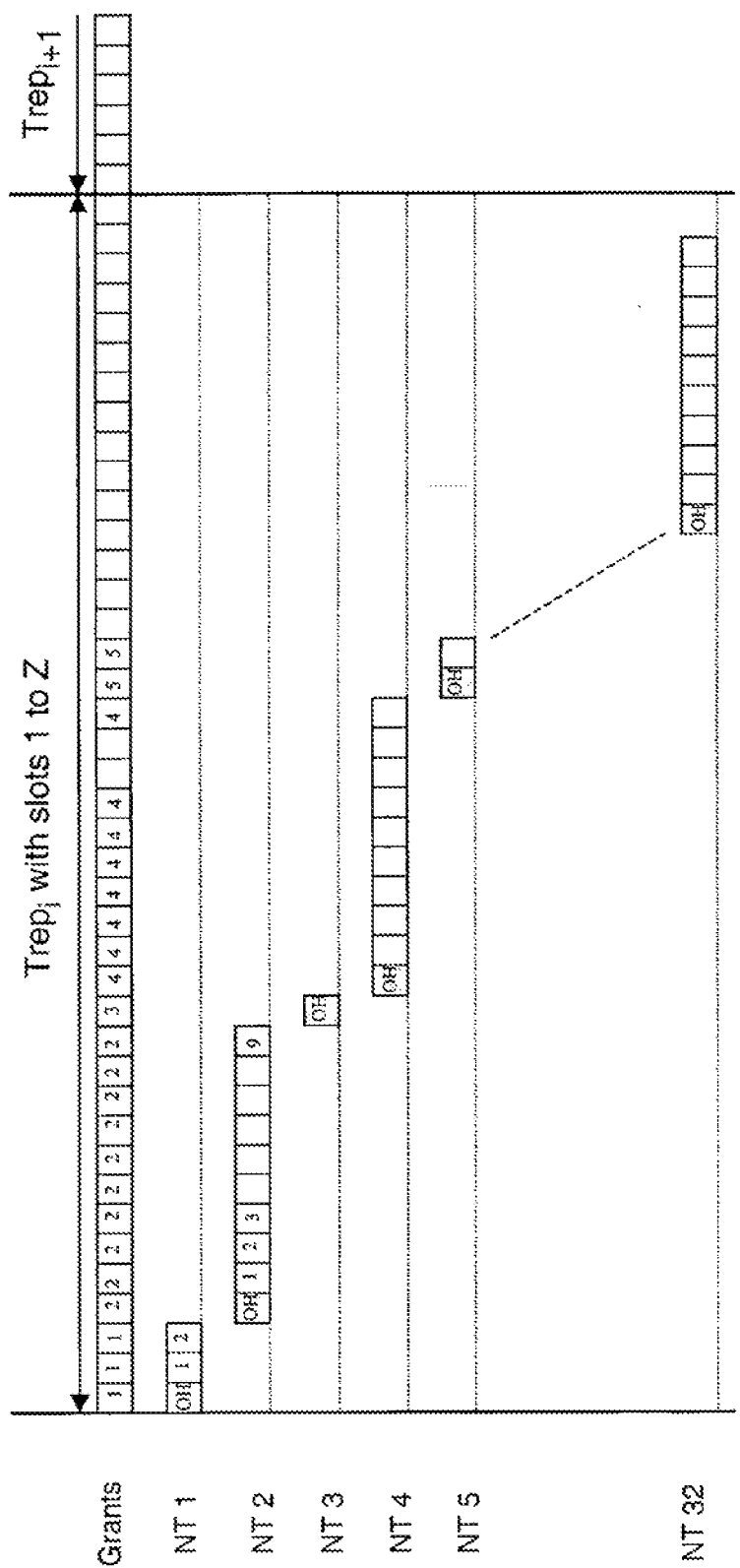
FIG. 3 shows a sequence of upstream time-slots within one buffer reporting interval used by a time division multiple access network according to the present application.

The line terminator LT allocates the time slots in a flexible and dynamic way. Indeed the upstream transfer capacity of the time division multiple access network is shared amongst the network terminators NT1, NT2, NT3, ..., NT31, NT32 based on their needed and requested upstream bandwidth to transmit upstream information. This needed upstream bandwidth is requested by the network terminators NT1, NT2, NT3, ..., NT31, NT32 to the line terminator LT. The requested bandwidth is translated by the line terminator LT in a number of allocated timeslots. This is realised by creating according the requested bandwidth of the network terminators NT1, NT2, NT3, ..., NT31, NT32 a stream of grants (as shown in FIG. 3). It has to be remarked that the detailed working of this allocation goes beyond the scope of this invention and is therefore not described. The aim is the use of the grants to inform the network terminators NT1, NT2, NT3, ..., NT31, NT32 of the allocated timeslots. It is further assumed that the grants are dealt with as presented in FIG. 3 where each network terminator is granted multi-slots for forwarding databursts.

Such a Line terminator LT comprises a grant transmitting part GTP that is adapted to transmit at grants towards a network terminator in order to allocate corresponding upstream time-slot to the network terminator and a detector DET for detecting overhead data in a first timeslot of a multi-slot data burst.

Following this embodiment the stream of grants is provided to the receiver REC of each network terminator.

The receiver REC in each network terminator terminators NT1, NT2, NT3, ..., NT31, NT32 (only shown for NT2) is included to receive a grant from the line terminator LT within the downstream information; and the transmitter TR which is coupled to this receiver, is included to transmit, upon recognition by the network terminator of its grant as being associated to itself, an upstream data packet in an upstream timeslot. In the cited prior art, the upstream data packet comprises an overhead in front of a payload. However, in contrast to this cited prior art, in the present invention the entire first timeslot is filled with overhead data, and for each adjacent subsequent grant being associated to the same network terminator the network terminator fills the corresponding adjacent subsequent time-slot with payload. This results in a data burst of a network terminator towards the line terminator LT wherein the data is forwarded using a sequence of one or more adjacent subsequent timeslots wherefrom in any case a first timeslot only comprises overhead data.

In order to explain the subject method, it is supposed that network terminator NT2 is a higher order network terminator, e.g. a network terminator transmitting at 1.24416 Gigabit/sec.

At reception of a first grant that is associated to network terminator NT1 by the receiver of network terminator NT1, the transmitter of network terminator NT1 fills the corresponding upstream time-slot with overhead data. Further there are two additional grants associated to network terminator NT1 (as is shown in FIG. 3) received by the receiver of network terminator NT1, allocating two time-slots to network terminator NT1. Consequently, the transmitter of network terminator NT1 fills two timeslots subsequent to the timeslot dedicated to overhead (See FIG. 3). A subsequent grant is associated to network terminator NT2, as is shown in FIG. 3. The receiver of network terminator NT2 receives this grant and subsequently the transmitter NT2 fills the corresponding upstream time-slot with overhead data. Further there are nine additional grants associated to network terminator NT2 received by the receiver of network terminator NT2, allocating nine time-slots to network terminator NT2. Consequently, the transmitter of network terminator NT2 fills nine timeslots subsequent to the timeslot dedicated to overhead (See FIG. 3).

The network termination NT3 is the next network terminator in the cycle of 32 network terminators NT1, NT2, NT3, . . . , NT31, NT32 that is granted the opportunity to forward data towards the line termination LT. So at reception of a first grant that is associated to network terminator NT3 by the receiver of network terminator NT3, the transmitter of network terminator NT3 fills the corresponding upstream time-slot with overhead data. However, no further grant is associated to network termination NT3. Hence no further timeslots on behalf of network terminator NT3 are filled with payload. Then this procedure is continued by granting bandwidth to the subsequent network terminators NT4 up to NT32.

Figure 4:
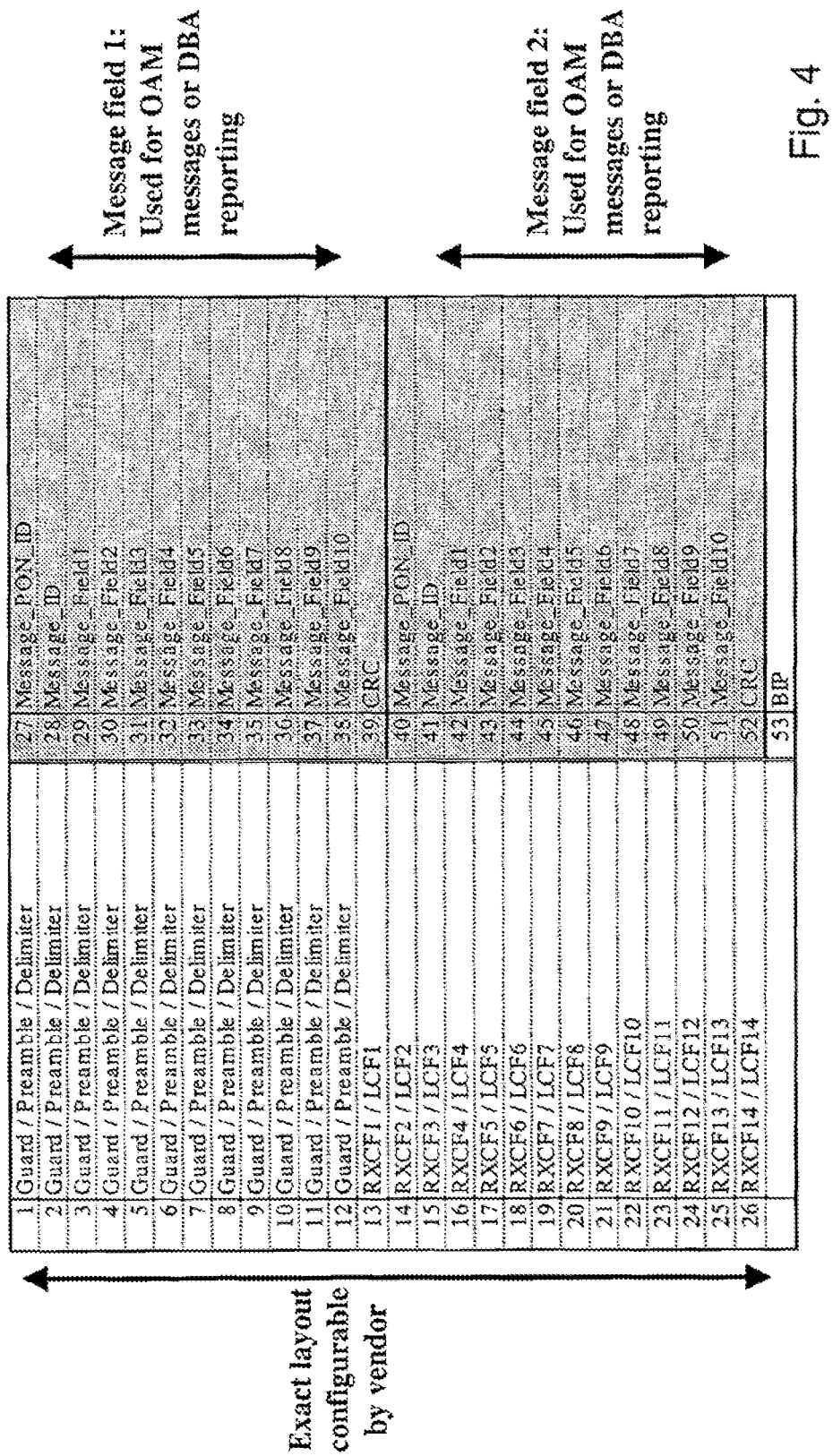
FIG. 4 presents a proposed structure of a first time-slot containing overhead data of each data frame of the present invention.

The first time slot of each data-frame forwarded by any of the network terminators NT1, NT2, NT3, . . . , NT31, NT32 containing overhead data may have the content as presented in FIG. 4.

It is to be remarked that the order wherein each of the network terminations is granted time-slots within one buffer reporting cycle is of no relevance. Of only relevance is that each network terminator is granted at least one burst per buffer reporting cycle.

A further remark is that the Line terminator LT receives a frame consisting of a first time-slot containing overhead data and potential subsequent timeslots containing payload data and consequently the line terminator has to accept the data contained in this first time slot as being overhead data. The structure of such overhead data is presented in FIG. 4.

The proposed structure of the overhead data comprises a first group of bytes being used for providing a sufficient guard time, for the delimiter, for the preamble and possibly for other physical layer related fields. A second part of the structure is used for operating and maintenance information (OAM) and for dynamic bandwidth allocation (DBA) reporting. Then a third part of the structure comprises an additional number of bytes for operating and maintenance information (OAM) and for dynamic bandwidth allocation (DBA) reporting.

The detecting of overhead data in a first timeslot of at least one time-slot allocated to the network terminator is done based on the grants transmitted to the network terminator.

Another remark is that the system may be an ATM based PON, wherein ATM cells are transported. The length of each such ATM cells is 53 bytes, excluding possible Forward Error Correction bits.

A final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is made only by way of example and not as a limitation on the scope of the invention, as defined in the appended claims.

The invention claimed is:

1. A time slot management method of a time division multiple access system that couples a line terminator via a tree-like network to a plurality of network terminators, said method comprising:

transmitting, by said line terminator, at least one grant towards a network terminator in order to allocate a plurality of adjacent subsequent upstream time-slots to said network terminator, respectively, wherein each of said plurality of time-slots corresponds to each of said at least one grant, respectively;

receiving said at least one grant by said network terminator from said line terminator;

recognizing if said at least one grant is associated to said network terminator, and in response to recognizing that said at least one grant is associated to said network terminator, transmitting, in a data burst, overhead data in a first time slot of said plurality of time-slots and payload data in each adjacent subsequent time-slot of said plurality of time-slots allocated to said network terminator, wherein the overhead data in the first time-slot is a combined overhead data of the each adjacent subsequent time-slot, and wherein said network terminator receives said at least one grant for transmitting the data burst at least once per buffer reporting cycle.

2. A time slot management method according to claim 1, wherein said overhead data comprises status reporting information and Operation and Maintenance information.

3. A time slot management method according to claim 1, wherein said payload data comprises payload data in combination with additional management information.

4. A time slot management method according to claim 1, wherein said payload data comprises Asynchronous Transfer Mode cells.

5. A time slot management method according to claim 1, wherein said payload data comprises Ethernet cells.

6. A time slot management method according to claim 1, wherein each network terminator of said plurality of network terminators is allocated at least one time-slot for transmitting data each buffer reporting interval.

7. A network terminator of a time division multiple access system that couples a line termination via a tree-like network to a plurality of network terminations, said network terminator comprising:

a receiver which receives at least one grant forwarded by said line termination;

a recognition part which recognizes if said at least one grant is associated with said network terminator; and a transmitter which, in response to recognizing that said at least one grant is associated to said network terminator, transmitting, in a data burst, overhead data in a first time slot of a plurality of time-slots and payload data in each adjacent subsequent time-slot of said plurality of time-slots allocated to said network terminator, wherein the overhead data in the first time-slot is a combined overhead data of the each adjacent subsequent time-slot, and wherein said network terminator receives said at least one grant for transmitting the data burst at least once per buffer reporting cycle.

8. A line terminator of a time division multiple access system that couples a line terminator via a tree-like network to a plurality of network terminators, said line terminator comprising:

a grant transmitting module which transmits at least one grant towards a network terminator in order to allocate a plurality of corresponding upstream time-slots to said network terminator, respectively, wherein each of said plurality of time-slots corresponds to each of said at least one grant, respectively; and a detector which detects overhead data in a first time-slot of the plurality of time-slots transmitted in a data burst and allocated to said network terminator based on said grants transmitted to said network terminator, wherein the overhead data in the first time-slot is a combined overhead data of each adjacent subsequent time-slot of said plurality of time-slots, and wherein said network terminator receives said at least one grant for transmitting the data burst at least once per buffer reporting cycle.

* * * * *